April 2, 1957  G. MATHESON  2,787,391
TRACTOR LOADER ATTACHMENT
Filed June 16, 1954

INVENTOR.
George Matheson
BY Alex. E. MacRae.
Attorney

United States Patent Office 2,787,391
Patented Apr. 2, 1957

2,787,391
TRACTOR LOADER ATTACHMENT
George Matheson, Princeton, Ontario, Canada Application June 16, 1954, Serial No. 437,180

1 Claim. (Cl. 214—140)

This invention relates to a tractor loader attachment and more particularly to a device for maintaining the level of the material receiving element of the tractor loader.

It is well recognized that it is desirable to maintain the bucket, scoop, fork or like material receiving element of a tractor loader, in generally parallel relation to the ground level whereby spillage of material from the material receiving element is substantially avoided. While various devices have been heretofore proposed for maintaining such parallel relation, they are generally of complicated structure and are not in widespread use on simple types of tractor loaders.

It is an object of this invention to provide a device for maintaining the material receiving element of a tractor loader in substantially parallel relation to ground level, such device being of simple inexpensive construction, of effective positive operation, and capable of convenient mounting on conventional tractor loaders.

Figure 1:
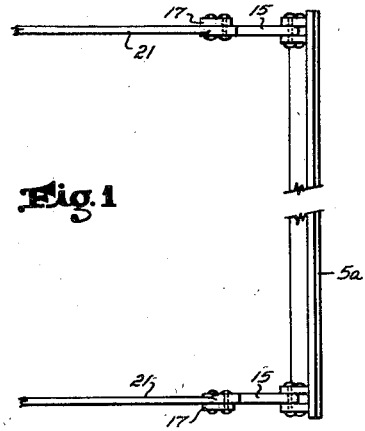
Figure 2:
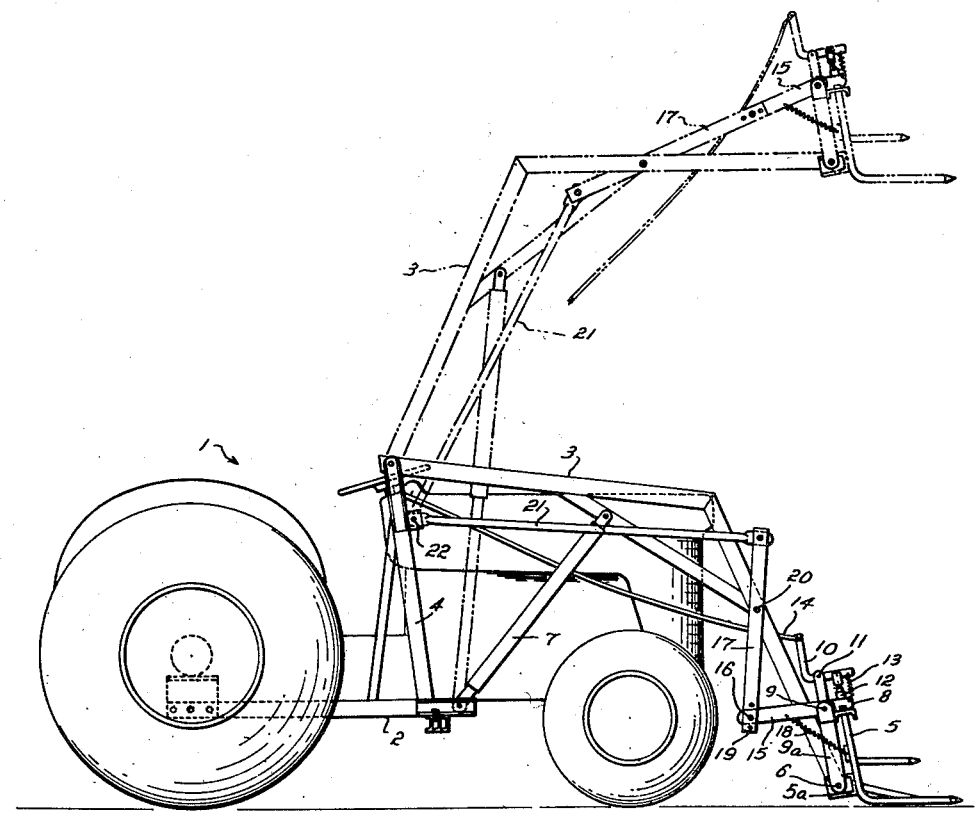

The invention will be described with reference to the accompanying drawing, in which, Figure 1 is a partial plan view of the device of the present invention, and Figure 2 is a side elevation of a tractor loader having the device of the present invention associated therewith.

In the drawing, 1 is a tractor loader of conventional type having a main frame 2, a swinging frame 3 pivotally carried at its rearward end by the upper end of a generally upright member 4 of the main frame 2, a material receiving element, such as a fork 5, having a supporting member 5a, pivotally mounted at 6 on the forward end of the swinging frame 3, and a pair of hydraulic cylinders 7 (one of which is shown) pivotally connected to the main frame 2 and swinging frame 3 for imparting swinging movement to the frame 3, all in the usual manner.

The upper portion of the element 5 is connected by means of a trip link 8 to one of a pair of pins 9 each carried by a bar 9a mounted on member 5a. The trip link is arranged to be actuated to release the element 5 and permit it to dump the material thereon by means such as a bell crank lever 10 pivotally mounted at 11 and connected at 12 to the link 8. One end of the lever 10 is connected by a spring 13 to the link 8 and an actuating cable 14 is connected to the other end of the lever.

A relatively short link 15 is pivotally mounted at one end on each pin 9 and its other end is pivotally connected at 16 to the lower end of one of a pair of lever arms 17. A stabilizing spring 18 connects each link 15 with the rear face of the element 5, as shown. Each lever arm 17 may be provided with additional apertures 19 whereby the pivot point 16 may be varied for desired adjustment as required.

Each lever arm 17 is pivotally mounted at 20 intermediate its ends on swinging frame 3. The upper end of each lever arm 17 is pivoted to one end of a relatively long link 21, the other end of which is pivoted at 22 to the upper end portion of member 4 at a point slightly below the pivotal connection therewith of swinging frame 3.

Figure 2 illustrates in full lines the generally lowermost position of element 5 and associated parts and in dotted lines its uppermost position. In the lowermost position, it will be observed that the lever arms 17 are in upright position. As the frame 3 is swung upwardly, it will be apparent that the lever arms 17 will swing about their pivots 20 to gradually lengthen the linkage connection between frame 2 and element 5 while maintaining a positive rigid support at all times on the element 5 to retain the latter in substantial parallel to the ground level. In the uppermost position, each link 15 is substantially longitudinally aligned with respective arm 17 and each link 21 is upwardly inclined.

There has thus been provided a simple linkage connection between the main frame of a tractor loader and its material receiving element which may be conveniently mounted on a conventional tractor loader and which is highly effective for its purpose.

I claim:

In a tractor loader having a fixed main frame, including a substantially upright member, a rigid frame swingably mounted on the upper end of said upright member and swingable as a unit thereabout, power means directly connected to said swinging frame to swing the same, said swinging frame having an angularly extending portion, and a material receiving element pivotally carried by the end of said angularly extending portion, means for maintaining said element at substantially constant level during its swinging movement comprising a pair of relatively short links each pivotally connected to said element, a pair of lever arms each pivotally mounted intermediate its ends on said angularly extending portion of the swinging frame, each said arm being in generally upright position in the lowermost position of said swinging frame and having its lower end pivoted to one of said links, and a pair of relatively long links each having one end pivoted to the other end of one of said lever arms and its other end pivoted to said upright member at a point below the pivotal connection of said swinging frame therewith, said lever arms being swingable into substantially longitudinal alignment with said relatively short links in response to swinging movement of said swinging frame to its uppermost position.

References Cited in the file of this patent

UNITED STATES PATENTS

| 1,765,905 | Clutter | June 24, 1930 |
| 2,383,686 | Ryan | Aug. 28, 1945 |
| 2,455,474 | Drott et al. | Dec. 7, 1948 |
| 2,537,010 | Andersen | Jan. 9, 1951 |
| 2,711,257 | Apel | June 21, 1955 |
| 2,718,318 | Schmucker et al. | Sept. 20, 1955 |